(12) United States Patent
Asagiri et al.

(10) Patent No.: US 6,318,585 B1
(45) Date of Patent: Nov. 20, 2001

(54) COVER MOUNTING STRUCTURE FOR WEBBING RETRACTOR

(75) Inventors: Katsuki Asagiri; Tomonori Nagata, both of Aichi-ken (JP)

(73) Assignee: Kabushiki Kaisha Tokai-Rika-Denki-Seisakusho (JP)

( * ) Notice: Subject to any disclaimer, the term of this patent is extended or adjusted under 35 U.S.C. 154(b) by 0 days.

(21) Appl. No.: 09/544,912

(22) Filed: Apr. 7, 2000

(30) Foreign Application Priority Data

Apr. 9, 1999 (JP) .................................................. 11-102773

(51) Int. Cl.[7] .................................................. B65D 45/16
(52) U.S. Cl. .......................................... 220/788; 220/326
(58) Field of Search .................................. 220/4.21, 284, 220/324, 326, 788

(56) References Cited

U.S. PATENT DOCUMENTS

| | | | |
|---|---|---|---|
| 3,840,152 | * 10/1974 | Hodge | 220/783 |
| 4,852,792 | * 8/1989 | Hale | 220/788 |
| 5,137,260 | * 8/1992 | Pehr | 220/326 |
| 5,348,549 | * 9/1994 | Brown et al. | 220/254 |
| 5,577,779 | * 11/1996 | Dangel | 220/326 |
| 5,862,935 | * 1/1999 | Dubois et al. | 220/326 |
| 5,931,514 | * 8/1999 | Chung | 220/326 |
| 5,979,691 | * 11/1999 | Von Holdt | 220/326 |
| 6,006,941 | * 12/1999 | Hitchings | 220/326 |

* cited by examiner

*Primary Examiner*—Joseph M. Moy
(74) *Attorney, Agent, or Firm*—Nixon Peabody LLP; Thomas W. Cole

(57) ABSTRACT

The present invention discloses a cover mounting structure for a webbing retractor. This structure relates to a mounting structure of a cover mount and a cover which hold a power spring used for taking up a webbing. By inserting a claw of the cover into an engagement hole portion of the cover mount, a claw on a folded member in which the engagement hole portion is formed enters into a hole portion of the engagement portion, so that the engagement portion is anchored by the claw. That is, the cover can easily be fixed onto the cover mount. Moreover, the engagement portion has elasticity and is constantly urged in the direction of withdrawal by the restoring force, so that the cover does not generate strange sounds.

9 Claims, 7 Drawing Sheets

COVER MOUNTING STRUCTURE FOR WEBBING RETRACTOR

BACKGROUND OF THE INVENTION

1. Field of the Invention

The present invention relates to a mounting structure for a cover member which covers power springs, sensors or the like mounted on a side of a webbing retractor.

2. Description of the Related Art

In a webbing retractor, a power spring is mounted on a side of the device to take up a webbing which has been wound around a spool. The power spring is held by a cover and a cover mount, and one end of the spring is anchored to a rotation shaft which transmits a rotation force to the spool whereas the other end is anchored to the cover. Therefore, as the webbing is drawn out, the rotation shaft rotates and a predetermined elastic force builds up in the power spring, thereby applying an rewinding force to the webbing.

The cover to which one end of the power spring is anchored is attached to a predetermined position of the cover mount and fixed thereto using resin rivets (plugs) or the like. Accordingly, when an impact in the event of a collision of the vehicle acts on the webbing retractor, the cover comes off the cover mount (i.e., the elastic force of the power spring is released), so that no slackness is generated in the webbing.

Conventional cover mounting methods, however, comprise an assembling step in which a cover is attached to a predetermined position of the cover mount, and a resin rivet hammering step, so that the methods have been complicated with many working processes.

Further, there has also been the drawback that when the resin rivet is loosened due to the use of the webbing retractor, the cover continues to rattle, thereby generating a strange sound every time the webbing retractor is used.

SUMMARY OF THE INVENTION

In view of the above, an object of the present invention is to provide a cover mounting structure for a webbing retractor which is easily assembled and does not cause strange sounds.

In order to achieve the aforementioned object, in a first aspect of the present invention, a cover mounting structure for a webbing retractor comprises a cover mount provided with an engagement receiving portion having an engagement hole portion formed therein, a cover provided with an elastic engagement portion for insertion into the engagement hole portion, an engagement claw provided on one of the engagement portion and the engagement receiving portion, and an anchor portion which receives and anchors the claw when the engagement portion is inserted into the engagement hole to a predetermined position and which is provided on the other of the engagement portion and the engagement receiving portion. The claw elastically deforms as the engagement portion is inserted into the engagement hole portion, and after the engagement portion is inserted to the predetermined position, the claw at least partially returns to the original shape poximate the anchor portion for retaining the cover onto the cover mount.

In accordance with the first aspect, simply by elastically deforming and inserting the engagement portion provided on the cover into the engagement hole portion provided on the cover mount, the claw provided either on the engagement portion or on the engagement hole portion is anchored to the anchor portion provided on the other portion, thereby enabling the cover to be easily positioned on the cover mount and fixed thereto.

In an inserted state, the elastically deformed engagement portion is constantly urged in the direction of withdrawal from the engagement hole portion, so that the engaged state between the claw and the anchor portion is not loosened. That is, the cover is prevented from rattling against the cover mount.

DETAILED DESCRIPTION OF THE PREFERRED EMBODIMENTS

First, a cover mounting structure for a webbing retractor according to a first embodiment of the present invention will be described in detail.

Figure 1:
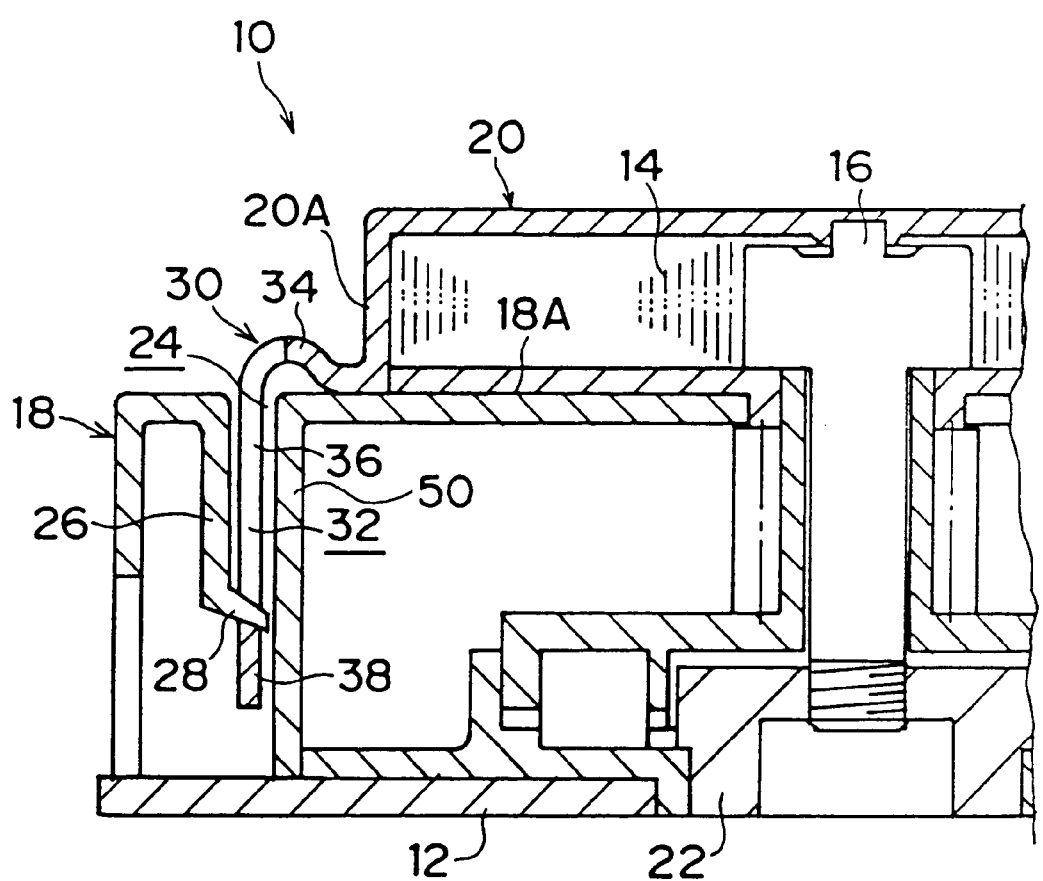
FIG. 1 is a sectional view showing main portions of a cover mounting structure for a webbing retractor according to a first embodiment of the present invention.

As shown in FIG. 1, a webbing retractor 10 basically comprises a frame 12, which is mounted on a vehicle body, a spool (not shown) which is axially supported by the frame 12 so as to be rotatable, and around which is wrapped a webbing, a power spring 14 which supplies retracting force to the spool, a rotation shaft body 16 which transmits rotation force between the spool and the power spring, a cover mount 18 which axially supports the rotation shaft body 16 and the like in a freely rotatable manner, and a cover 20 which holds the power spring 14.

A sleeve 22 rotated integrally with the spool is passed through the frame 12, and the rotation shaft body 16 axially supported by the cover mount 18 is fixed to the distal end of the sleeve 22.

One end of the power spring 14 is anchored to the rotation shaft body 16, whereas the other end of the power spring is anchored to the cover 20. That is, the mechanism is such that as the spool rotates when the webbing is pulled out, the rotation shaft body 16 rotates and the power spring 14 is wound up, thereby building up elastic energy (rewinding force).

Figure 2:
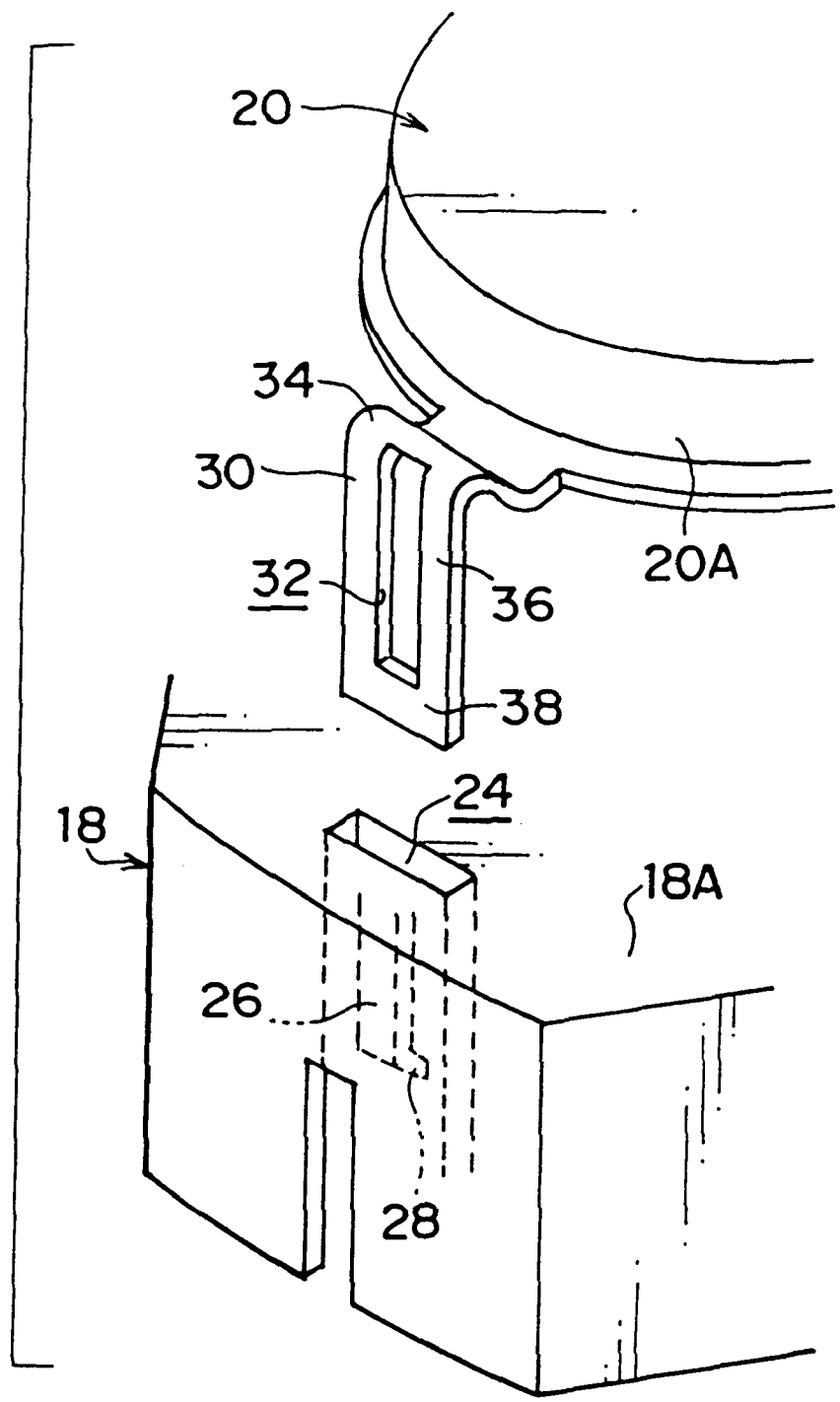
FIG. 2 is a perspective view showing the cover mounting structure for the webbing retractor according to the first embodiment of the present invention.

As shown in FIG. 2, the cover mount 18 has a disc-shape or a polygonal-shape and is fixedly mounted on the frame 12. An engagement hole portion 24 is formed at a predetermined position on an outer peripheral side of the cover mount 18. Specifically, a folded member 26 is provided as an elastic (i.e., elastically deformable) engagement receiving portion at a predetermined position on an outer peripheral side of the frame 12, such that the engagement hole portion 24 is formed between the folded member 26 and an inner wall 50. A claw portion 28 is formed at the distal end of the folded member 26 (see FIG. 1).

As shown in FIG. 2, the cover 20 has a disc-shape or a polygonal-shape and an engagement claw 30 is formed as an elastic engagement portion at a predetermined position on an outer peripheral portion of the cover 20. The engagement claw 30 comprises, as shown in FIG. 1, a deformed portion 34 which has a shape such that it once curves upward, in terms of FIG. 1, from the outer peripheral portion of the cover 20 and then turns downward, and an engagement portion 36 which extends downward continuing from the deformed portion 34. The engagement portion 30 has elasticity due to the existence of the deformed portion 34. A rectangular hole portion 32 extending in a longitudinal direction is formed in the engagement portion 36.

The operation of the cover mounting structure for the webbing retractor 10 having the above structure will be described hereinafter.

Figure 3:
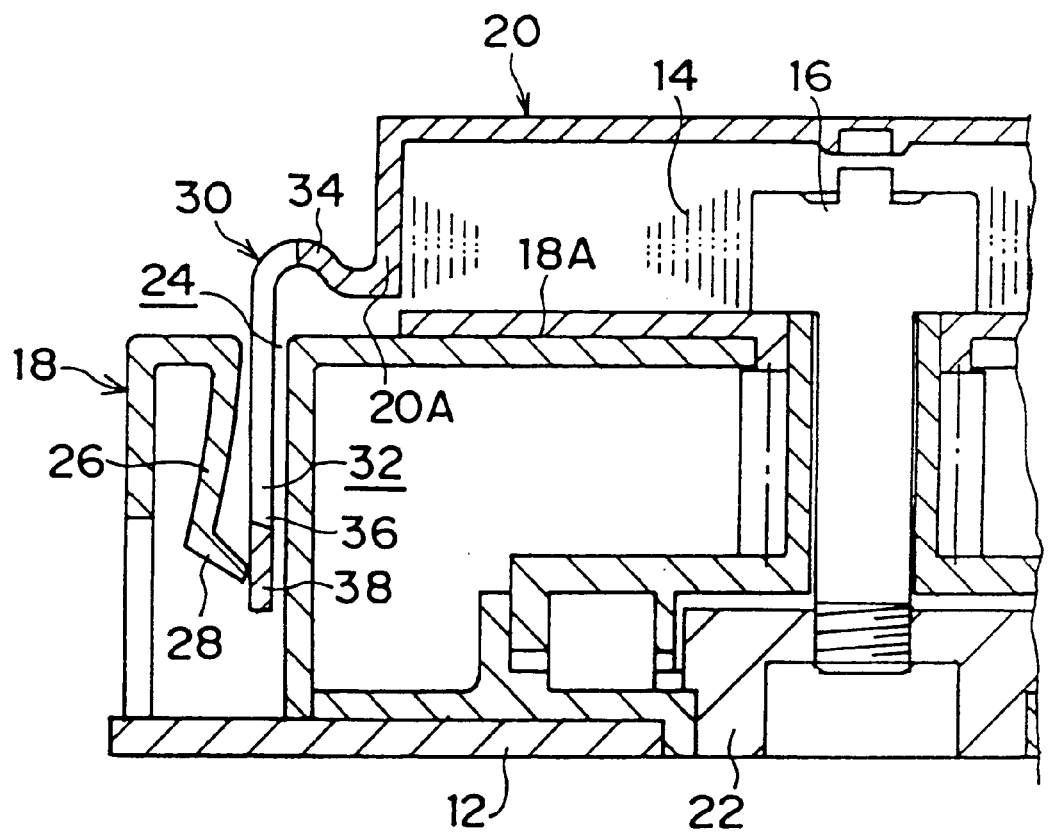
FIG. 3 is a diagram showing a cover mounting state of the webbing retractor according to the first embodiment of the present invention.
Figure 4:
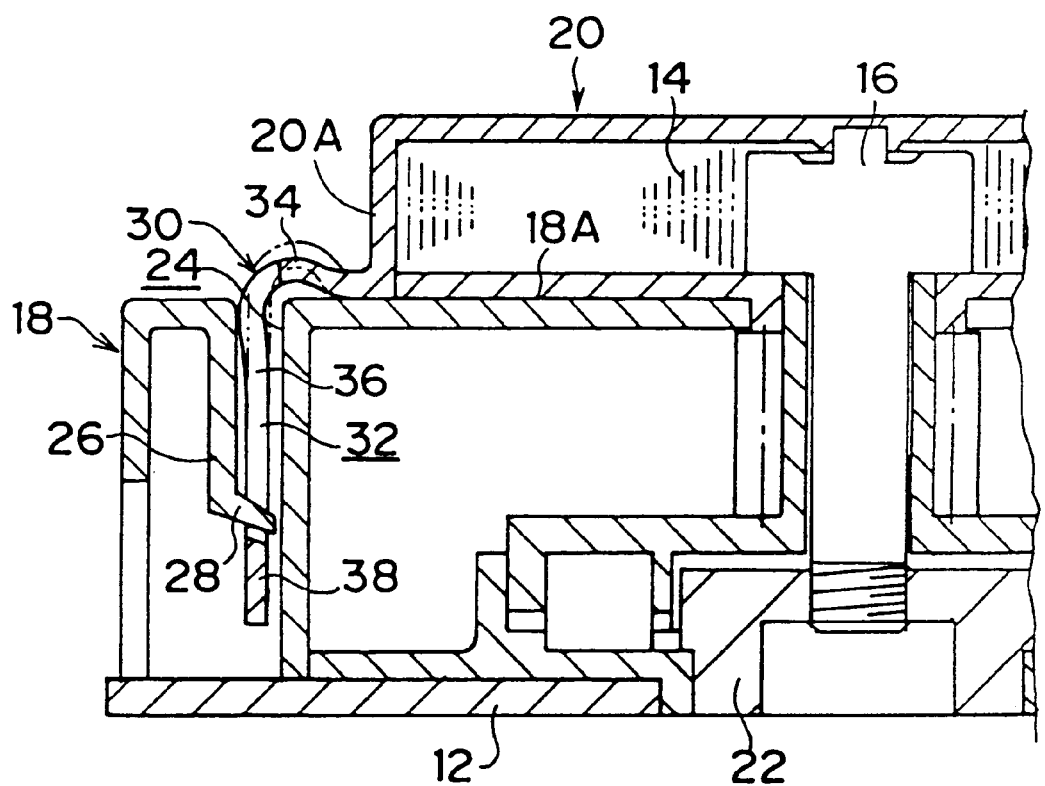
FIG. 4 is a diagram showing another cover mounting state of the webbing retractor according to the first embodiment of the present invention.

Upon assembling, the cover 20 is aligned at a predetermined position on the cover mount 18, and the engagement claw 30 of the cover 20 is inserted into the hole portion 24 on the cover mount 18 to fix the cover 20 onto the cover mount 18 (see FIG. 3). Consequently, the distal end portion 38 of the engagement claw 30 advances so as to displace (flexibly bend) the claw portion 28 of the folded member 26. That is, the folded member 26 including the claw portion 28 is elastically deformed by being pressed by the advancing engagement claw 30. When a side surface 20A of the cover 20 is placed in contact with a mounting surface 18A of the cover mount 18, the hole portion 32 is located at a position opposing the claw portion 28, therefore the claw portion 28 of the folded member 26 enters into the hole portion 32 (see FIG. 4). At this time, the engagement claw 30, which has been inserted into the hole portion 24 to press the claw portion 28 and has been flexibly bent inward thereby, tries to return to its original position (i.e., from the position indicated by the solid line to that indicated by the two-dot chain line in FIG. 4). Accordingly, the distal end portion 38 of the engagement claw 30 engages the claw portion 28, so that the cover 20 is fixed to the cover mount 18 (see FIG. 1).

In this manner, simply by inserting the engagement claw 30 of the cover 20 into the hole portion 24 of the cover mount 18, the claw portion 28 is engaged with the hole portion 32 (distal end portion 38), so that the cover 20 is fixed to a predetermined position on the cover mount 18. Therefore, the mounting process of the cover 20 is simplified.

Moreover, since the engagement claw 30 is constantly urged upward by a restoring force due to the flexible (elastic) deformation of the deformed portion 34, the claw portion 28 having entered into the hole portion 32 does not become separated from the distal end portion 38. That is, prevention of the cover 20 from rattling can be ensured.

Figure 5:
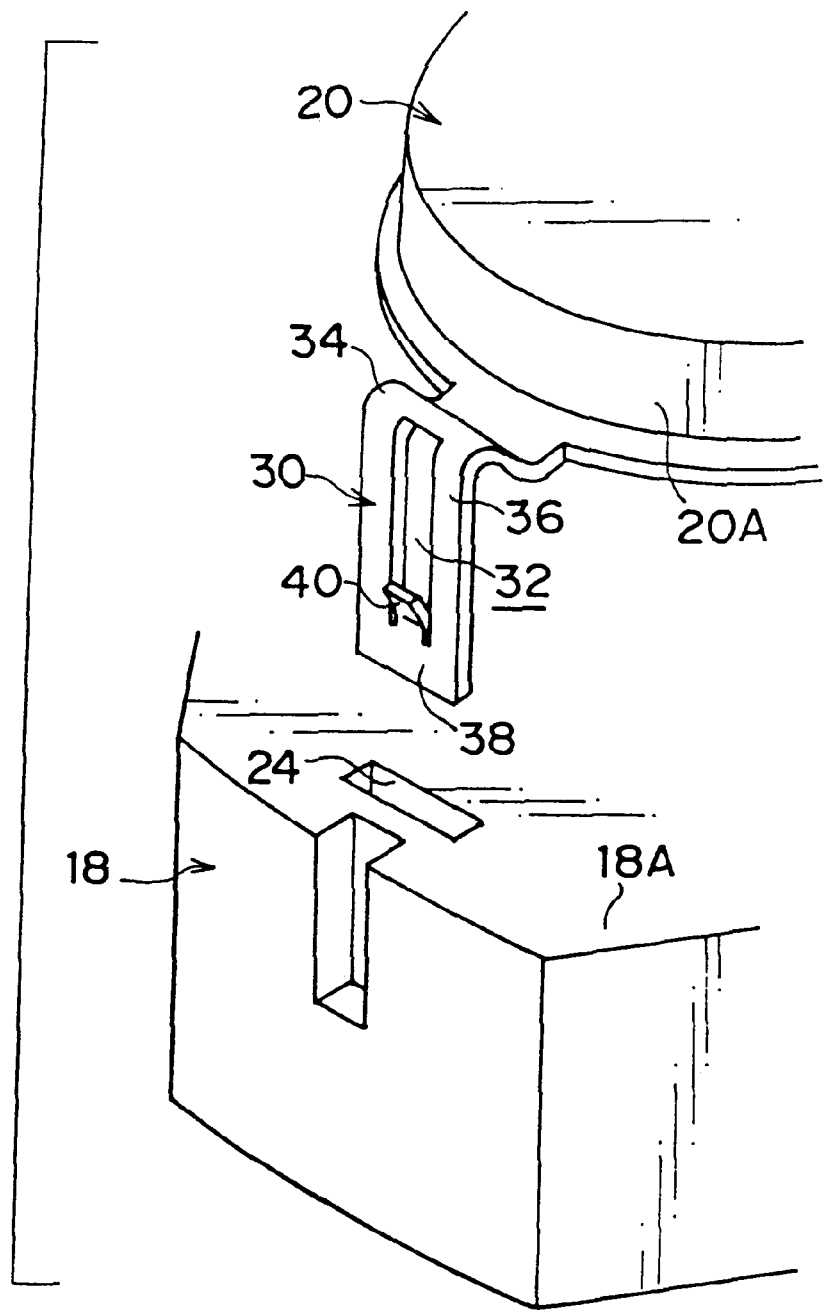
FIG. 5 is a perspective view showing a cover mounting structure for a webbing retractor according to a second embodiment of the present invention.
Figure 6:
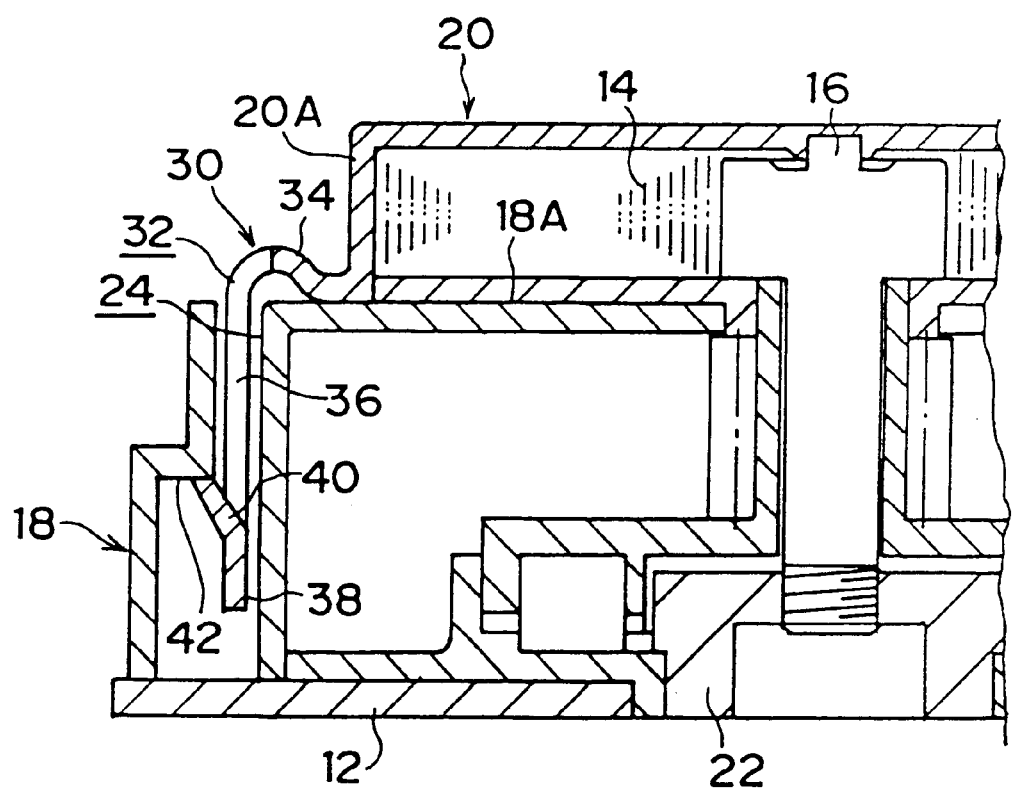
FIG. 6 is a sectional view showing main portions of the cover mounting structure for the webbing retractor according to the second embodiment of the present invention.
Figure 7:
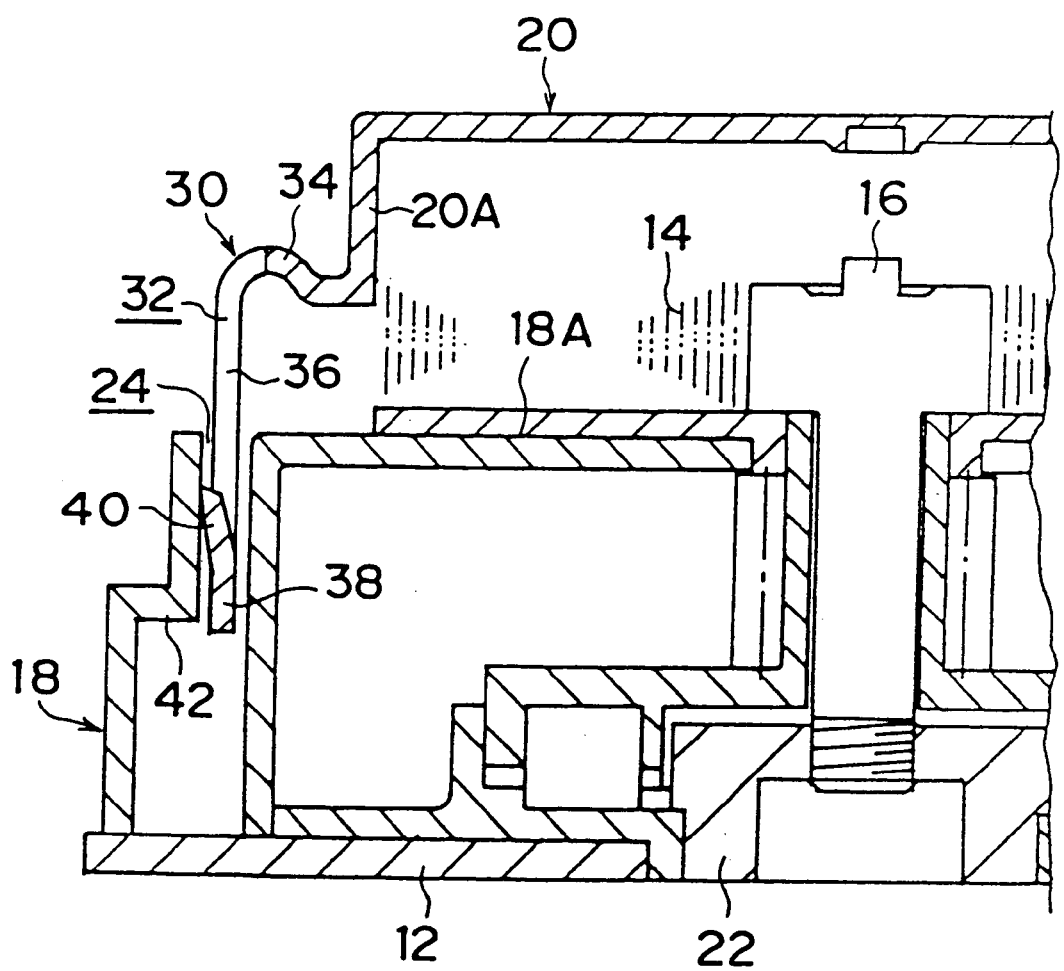
FIG. 7 is a diagram showing a cover mounting state of the webbing retractor according to the second embodiment of the present invention.

Referring to FIGS. 5 to 7, a cover mounting structure according to a second embodiment of the present invention will now be described. Like reference numerals are used to designate elements identical to those in the first embodiment, and a detailed description thereof will be omitted.

The second embodiment differs from the first embodiment in that, as shown in FIGS. 5 and 6, an elastic claw portion 40, which is folded outward, is formed at the distal end of the engagement claw 30 of the cover 20 and the claw portion 40 engages with a stepped portion 42 formed on the rotating wall surface of the cover mount 18, thereby fixing the cover 20 onto the cover mount 18. The claw portion 40 protrudes more than the width of the hole portion 24.

Accordingly, inserting the engagement claw 30 into the hole portion 24 results in the claw portion 40 being forced into the hole portion 32 (see FIG. 7). Inserting the claw portion 40 deeper than the stepped portion 42 causes the claw portion 40 to be released and to engage with the stepped portion 42 (see FIG. 6). As a result, it becomes impossible for the engagement claw 30 to be pulled out from the hole portion 24, so that the cover 20 is fixed to the cover mount 18. Specifically, when the claw portion 40 is anchored by the stepped portion 42, the engagement claw 30 is urged by the deformed portion 34 toward a direction opposite to the direction in which the engagement claw 30 is deformed elastically, so that the engagement claw 30 engages tightly with the stepped portion 42 by means of the claw portion 40.

Therefore, this embodiment not only enables the cover 20 to be mounted easily in the same manner as the first embodiment, but also reliably prevents the cover 20 from rattling since the engagement claw 30 of the cover 20 is constantly urged upward by the restoring force of the deformed portion 34, so that the claw portion 40 is anchored to the stepped portion 42.

The cover mounting structure of the present invention can also be used for mounting a cover on the opposite side surface of the spool.

In brief, according to the above-mentioned structure of the present invention, a cover can be fixedly mounted easily onto a predetermined position on a cover mount, and rattling (the generation of strange sounds) can be reliably prevented.

What is claimed is:

1. A cover mounting structure for a webbing retractor having a rotation shaft body comprising:
    a cover mount that supports said rotation shaft body and is provided with an engagement receiving portion, said engagement receiving portion having an engagement hole portion formed therein;
    a cover provided with an elastic engagement portion for insertion into said engagement hole portion;
    an engagement claw provided on one of said engagement portion and said engagement receiving portion; and
    an anchor portion which receives and anchors said claw when said engagement portion is inserted into said engagement hole to a predetermined position, said anchor portion being provided on the other of said engagement portion and said engagement receiving portion;
    wherein said claw elastically defonns as said engagement portion is inserted into said engagement hole portion, and after the engagement portion is inserted to the predetermined position, the claw at least partially returns to the original shape proximate said anchor portion for retaining said cover onto said cover mount.

2. A cover mounting structure for a webbing retractor according to claim 1, wherein when said claw elastically deforms as said engagement portion is inserted into said engagement hole portion, said claw reaches a location proximate said anchor portion and then at least partially returns to the original shape.

3. A cover mounting structure for a webbing retractor according to claim 2, wherein said claw is provided on said engagement receiving portion, and said anchor portion is provided on said engagement portion, said anchor portion being a hole portion formed in said engagement portion.

4. A cover mounting structure for a webbing retractor according to claim 3, wherein as said engagement portion is inserted into said engagement hole portion, said claw on said engagement receiving portion and said engagement portion press against one another and elastically deform said claw, and thereafter said elastically deformed claw enters into a less restrictive area and at least partially returns to the original shape and anchors said claw in said hole portion.

5. A cover mounting structure for a webbing retractor according to claim 4, wherein said engagement portion is formed so as to be elastically deformable and when said claw is anchored in said hole portion, said claw and said engagement portion press against one another thereby snugly engaging said claw and said engagement portion.

6. A cover mounting structure for a webbing retractor according to claim 2, wherein said claw is provided on said engagement portion and said anchor portion is provided on said engagement receiving portion, said anchor portion being a stepped portion formed on said engagement receiving portion.

7. A cover mounting structure for a webbing retractor according to claim 6, wherein as said engagement portion is inserted into said engagement hole portion, said claw on said engagement portion and said engagement receiving portion press against one another and the claw elastically deforms, and thereafter said elastically deformed claw is released at said stepped portion and returns to the original shape, thereby anchoring said claw in said stepped portion.

8. A cover mounting structure for a webbing retractor according to claim 7, wherein a distance between the distal end of said claw and said engagement portion is greater than the width of said engagement hole portion when said claw is not elastically deformed.

9. A cover mounting structure for a webbing retractor according to claim 8, wherein when said claw is anchored in said stepped portion, said deformed portion is elastically deformed so as to urge said engagement portion in a direction opposite to the direction in which said engagement portion is deformed, thereby tightly engaging said engagement portion and said stepped portion by means of said claw.

* * * * *